United States Patent [19]

Umezu et al.

[11] Patent Number: 5,679,294
[45] Date of Patent: Oct. 21, 1997

[54] α-TRICALCIUM PHOSPHATE CERAMIC AND PRODUCTION METHOD THEREOF

[75] Inventors: Yoshikazu Umezu, Tokyo; Osamu Hayashi, Fuchu; Kazutaka Yoshizawa, Tokyo, all of Japan

[73] Assignee: Kabushiki Kaisya Advance, Tokyo, Japan

[21] Appl. No.: 396,141

[22] Filed: Mar. 1, 1995

[30] Foreign Application Priority Data

Mar. 2, 1994 [JP] Japan ................... 6-054790

[51] Int. Cl.$^6$ .......................... B29C 65/02; B29C 67/02
[52] U.S. Cl. ................... 264/44; 264/56; 264/59; 264/65; 264/122; 264/125; 264/317; 501/1; 501/123; 501/125
[58] Field of Search ................... 501/1, 123, 125; 264/44, 59, 65, 317, 56, 122, 125

[56] References Cited

U.S. PATENT DOCUMENTS

| | | | |
|---|---|---|---|
| 4,222,128 | 9/1980 | Tomonaga et al. | 501/1 |
| 4,371,484 | 2/1983 | Inukai et al. | 501/1 |
| 4,610,692 | 9/1986 | Eitenmuller et al. | 264/44 |
| 4,957,674 | 9/1990 | Ichitsuka et al. | 264/65 |
| 4,983,182 | 1/1991 | Kijima et al. | 501/102 |
| 5,034,352 | 7/1991 | Vit et al. | 264/59 |
| 5,180,426 | 1/1993 | Sumita | 501/1 |
| 5,306,673 | 4/1994 | Hermansson et al. | 501/1 |

FOREIGN PATENT DOCUMENTS

| | | |
|---|---|---|
| 67-12595 | 10/1980 | China. |
| 69-11638 | 2/1981 | China. |
| 59-174567 | 10/1984 | Japan. |
| 60-71567 | 4/1985 | Japan. |
| 1-203285 | 8/1989 | Japan. |
| 1487181 | 9/1977 | United Kingdom ............ 501/1 |

OTHER PUBLICATIONS

Introduction to the Ceramic Processing, John Wiley (Singapore) 1989, p. 13, Fig. 1.3.
Introduction to Fine Ceramics, John Wiley (Chicheste) 1987, Ch. 5, §5.1.
"Preparation of α– and β–Tricalcium Phosphate Ceramics, with and without Magnesium Addition"., Roger Famery et al., Ceramics International, vol. 20, pp. 327–336 (1994). No Month!
Derwent Publications Ltd., abstract No. 88–095527, JP–A–63 046 167 (Meidensha), Feb. 1988.
Chemical Abstracts, "Preparation of Alpha Form Calcium Phosphate Cement by Wet Method.", vol. 115 No. 18, abstract No. 189851, Nov. 4, 1991.

Primary Examiner—Mark L. Bell
Assistant Examiner—Louis M. Troilo
Attorney, Agent, or Firm—Foley & Lardner

[57] ABSTRACT

A high purity α-tricalcium phosphate ceramic having a superior biocompatibility for use mainly as a bone filler, is produced by shaping a powder material formed by a wet method, followed by sintering it and then cooling at a predetermined rate.

9 Claims, 2 Drawing Sheets

α-TRICALCIUM PHOSPHATE CERAMIC AND PRODUCTION METHOD THEREOF

BACKGROUND OF THE INVENTION

1. Field of the Invention

The present invention relates to an α-tricalcium phosphate ceramic having a superior biocompatibility for use mainly as a bone filler and a method for producing the same.

2. Description of the Related Art

In the past, hydroxyapatite and β-tricalcium phosphate have been known as ceramics for use as bone fillers. These ceramics are known to be bioactive materials and can bond directly with a natural bone. In general, when these materials are implanted in bone, a thin layer of bioapatite forms in the body at the interface between the bone and the materials. A new bone is said to be formed starting from this point. That is, after bioapatite is formed at the surface of the materials, it is believed that the materials are not dissolved or absorbed much at all. In fact, these materials have slow rates of absorption into the body and are never completely replaced by a new bone.

On the other hand, α-tricalcium phosphate is said not to exhibit formation of a bioapatite layer at the interface of the bone with the material, has a faster rate of absorption in the body compared with hydroxyapatite and β-tricalcium phosphate, and has an extremely high ability to form a new bone. The ideal bone filler should have a high bone-forming ability and should completely disappear and be completely replaced by bone. For a long time, it has been thought that if production of a shaped article made of α-tricalcium phosphate were possible, it could be an extremely favorable bone filler. However, α-tricalcium phosphate has been difficult to fabricate as a ceramic up to now due to the difficulty of formation by a wet method, the unavoidable formation of cracks at the time of sintering.

SUMMARY OF THE INVENTION

Accordingly, the objectives of the present invention are to eliminate the above-mentioned disadvantages of the prior art and to provide a high purity α-tricalcium phosphate ceramic and a method for producing an α-tricalcium phosphate ceramic, which is expected to be used as a material for an ideal bone filler.

In accordance with the present invention, there is provided a method for producing an α-tricalcium phosphate ceramic comprising the steps of:

shaping a powder material under pressure, or simultaneously with the shaping under pressure;

sintering the shaped powder; and, then cooling the sintered product.

In accordance with the present invention, there is also provided a method for producing an α-tricalcium phosphate ceramic comprising the steps of shaping a powder material obtained by a wet method using the monoaxial press method or CIP method (i.e., cold isostatic pressing method);

sintering the shaped powder material at a temperature of 1100° to 1500° C. for 1 to 200 hours; and, then cooling the sintered product at a cooling rate of 100° to 2000° C./hr.

In accordance with the present invention, there is further provided a method for producing an α-tricalcium phosphate ceramic comprising the steps of:

sintering a powder material obtained by a wet method using a hot press method or HIP method (i.e., hot isostatic pressing method) at a temperature of 200° to 1500° C. for 1 to 200 hours.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
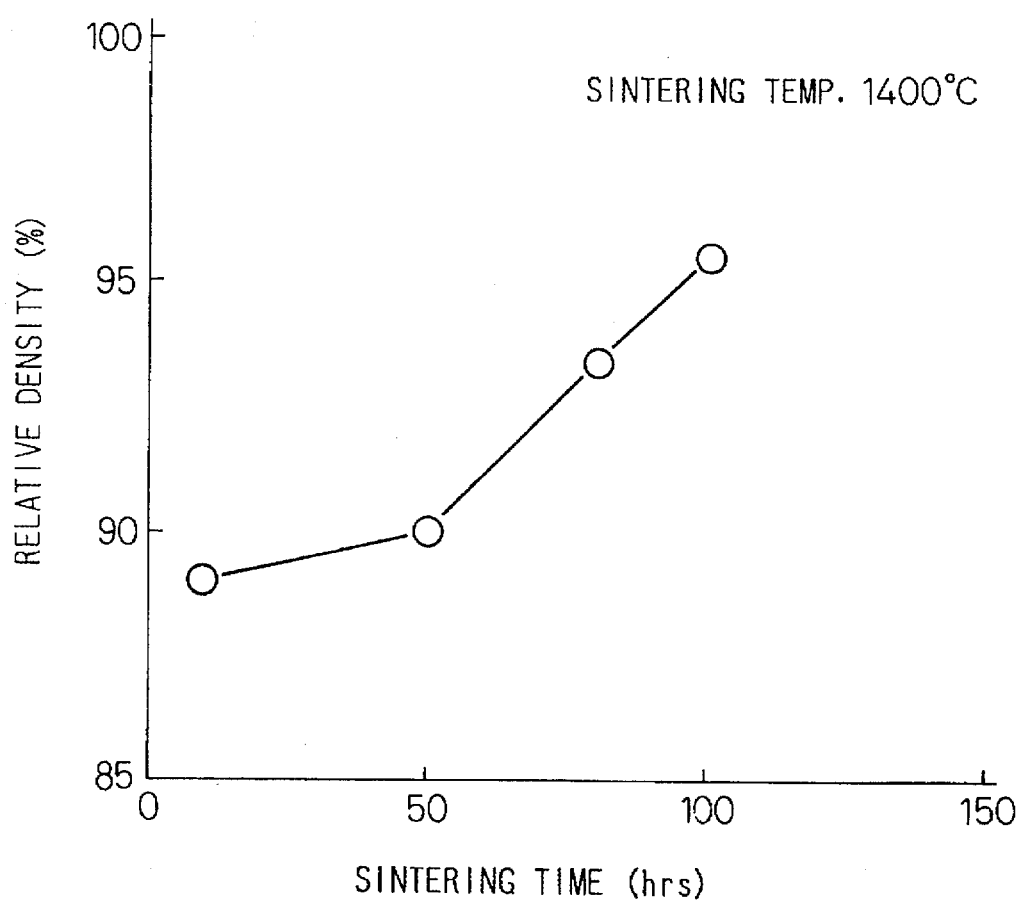
FIG. 1 is a graph showing the isothermal relationship between the sintering time and relative density at 1400° C.

The method for producing an α-tricalcium phosphate ceramic according to the present invention will now be explained in further detail below.

The α-tricalcium phosphate in the present invention means the high temperature stable phase of tricalcium phosphate and is expressed in chemical composition as $Ca_3(PO_4)_2$. Tricalcium phosphate has β-phase (low temperature phase), γ-phase (high pressure phase), and α-phase (high temperature phase), which are the same in composition. The stable region of the α-phase is 1125° to 1500° C.

The method of production of a dense ceramic of α-tricalcium phosphate is as follows. As an example of the wet method, an aqueous solution of phosphoric acid is gradually added dropwise to, for example, a 0.5M suspension of calcium hydroxide. This is stirred and a uniform reaction is caused to obtain amorphous tricalcium phosphate. This amorphous tricalcium phosphate is filtered, then dried at, for example, 60° C. then pulverized by a kneader. The resultant powder is provisionally sintered at a temperature of 600° to 1200° C. is homogeneously mixed with a thickening agent, then is shaped using a press at a pressure of 50 to 200 MPa. Note that during the sintering, amorphous tricalcium phosphate is formed in the temperature range of 600° to 750° C., β-tricalcium phosphate in the temperature range of 775° to 1100° C., and α-tricalcium phosphate in the temperature range of 1125° to 1200° C. The shaped article is sintered at a temperature of 1150° to 1500° C., preferably 1350° to 1450° C., for 1 to 200 hours, more preferably 50 to 100 hours, and then cooled at a cooling rate of 500° to 1000° C./hr. The press used may be a monoaxial press, hot press, rubber press, etc.

The method of production of the porous ceramic of α-tricalcium phosphate is as follows. A thickening agent is homogeneously mixed with a powder of tricalcium phosphate formed by the above-mentioned method, then the mixture is made into a slurry by addition of water or ethanol. The slurry is then uniformly impregnated into a plastic sponge and subjected to the same sintering as with the above dense body.

By sintering at a high temperature over a long period as mentioned above, it is possible to fabricate a single phase α-tricalcium phosphate ceramic having a high purity and a mole ratio of Ca/P of about 1.50. Further, by changing the conditions of formation, conditions of sintering, etc., it is possible to fabricate shaped articles containing hydroxyapatite, β-tricalcium phosphate, tetracalcium phosphate, and other calcium phosphates as well.

EXAMPLES

The present invention will now be further illustrated by, but is by no means limited to the following Examples.

Example 1

α-tricalcium phosphate powder and β-tricalcium phosphate powder formed by the wet method were fabricated into disk shaped articles of diameters of about 28 mm and thicknesses of about 5 mm by using a monoaxial press. These were sintered at a temperature range of 1000° to 1500° C. and were identified in phase by the powder X-ray diffraction method. As a result, it was found that high purity α-tricalcium phosphate ceramic what was obtained from α-tricalcium phosphate powder when sintered at conditions of 1400° to 1450° C. and high purity α-tricalcium phosphate ceramic was obtained from β-tricalcium phosphate powder when sintered at conditions of 1150° to 1400° C. Further, depending on the conditions, it was possible to fabricate a tricalcium phosphate ceramic with an α-phase at the surface and a β-phase inside. The relationship between the sintering temperature and phase is shown in Table 1.

TABLE 1

| Sintering temperature (°C.) | β-TCP | | α-TCP | |
| --- | --- | --- | --- | --- |
| | Ceramic surface | After pulverization | Ceramic surface | After pulverization |
| 1150 | α + β | α + β | α | α |
| 1200 | α + β | α + β | α | α |
| 1250 | α + β | α + β | α | α |
| 1300 | α | α + β | α | α |
| 1350 | α | α + β | α | α |
| 1400 | α | α | α | α |
| 1450 | α | α | — | — |

In the Table, the α-TCP and β-TCP mean the α-tricalcium phosphate powder and β-tricalcium phosphate powder of the starting materials. "Ceramic surface" shows the information of the powder X-ray diffraction from the surface of the sintered body, while "After pulverization" shows the information from the powder after pulverization of the sintered body.

Next, the relative densities of α-type tricalcium phosphate ceramics obtained when sintering shaped articles of α-tricalcium phosphate powder at a fixed 1400° C., but changing the sintering time were found. It was learned that the relative density increased along with the sintering time and that an approximately 95 percent dense body was obtained with a sintering time of 100 hours (See FIG. 1).

Example 2

α-tricalcium phosphate powder formed by the wet method was heat treated under pressure using a hot press under conditions of 80 MPa and 1350° C., whereupon a high purity α-tricalcium phosphate ceramic was obtained.

Example 3

α-tricalcium phosphate powder, β-tricalcium phosphate powder, and amorphous tricalcium phosphate powder formed by the wet method were made into slurries by adding 50 percent of water. These were then impregnated into polyurethane sponges, then dried and sintered at a sintering temperature of 1400° C. and a sintering time of 50 hours, whereupon high purity α-type tricalcium phosphate ceramics were obtained. These had sufficient practical strength as a bone filler.

Example 4

Figure 2:
FIG. 2 is a view of a photograph of a non-decalcified sample (implanted 3 months) of an α-tricalcium phosphate ceramic when implanted in the femur of an osteophoresis model rat obtained in Example 4.

Dense bodies of α-tricalcium phosphate and hydroxyapatite cut into rectangular columns of 0.7 mm×0.7 mm×5 mm were implanted into the femur of osteophoresis model rats subjected to ovariectomies to observe the reaction with bone tissue. As a result, in the case of α-tricalcium phosphate, new bone was formed directly around the specimen. There was no interposition of fibrous connecting tissue observed. The new bone and the material bonded directly. Further, the new bone almost completely covered the surface of the specimen and the rectangular column material became rounded, so there were signs of absorption over time and the possibility was suggested of complete disappearance with long term implantation (see FIG. 2).

Figure 3:
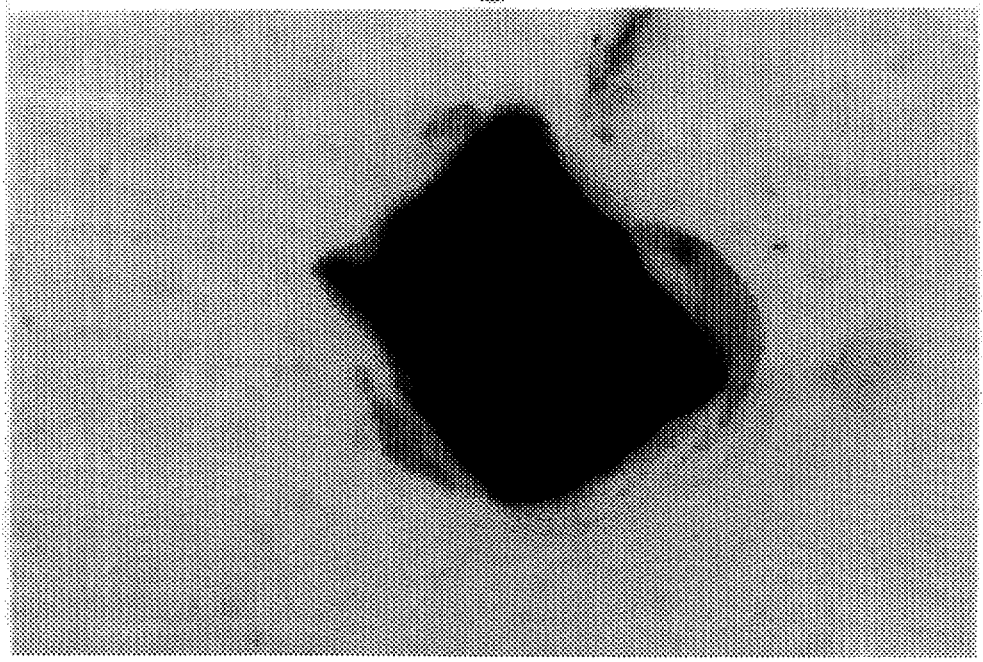
FIG. 3 is a view of a photograph of a non-decalcified sample (implanted 3 months) of a hydroxyapatite ceramic when implanted in the femur of an osteophoresis model rat obtained in Example 4.

On the other hand, in the case of the hydroxyapatite, fibrous connecting tissue was formed around the specimen. There was little formation of new bone. Further, the shape of the article remained the same as at the time of implantation, so there was no sign of dissolution and it was believed that there would be no absorption even with long-term implantation (see FIG. 3).

As explained above, according to the method of production of the present invention, it is possible to produce a ceramic usable as a bone filler, superior in biocompatibility, high in the ability to form bone, and having the ability of being replaced by bone.

We claim:

1. A method for producing an α-tricalcium phosphate ceramic comprising the steps of:
    shaping a powder material obtained by a wet method using the monoaxial press method or CIP method;
    sintering the shaped powder material at a temperature of 1100° to 1500° C. for 50 to 200 hours; and, then
    cooling the sintered product at a cooling rate of 100° to 2000° C./hr.

2. A method for producing an α-tricalcium phosphate ceramic, wherein a powder material obtained by the wet method as claimed in claim 1 is impregnated in a porous plastic material, followed by sintering.

3. A method for producing an α-tricalcium phosphate ceramic comprising the steps of:
    sintering a powder material obtained by a wet method using a hot press method or HIP method at a temperature of 200° to 1500° C. for 50 to 200 hours.

4. A method for producing an α-tricalcium phosphate ceramic as claimed in claim 1, wherein the powder material formed by a wet method is at least one powder selected from the group consisting of β-tricalcium phosphate powder, α-tricalcium phosphate powder, and amorphous calcium phosphate powder, and mixtures of these powders with hydroxyapatite.

5. A method for producing an α-tricalcium phosphate ceramic as claimed in claim 2, wherein the powder material formed by a wet method is at least one powder selected from the group consisting of β-tricalcium phosphate powder, α-tricalcium phosphate powder, and amorphous calcium phosphate powder, and mixtures of these powders with hydroxyapatite.

6. A method for producing an α-tricalcium phosphate ceramic as claimed in claim 3, wherein the powder material formed by a wet method is at least one powder selected from the group consisting of β-tricalcium phosphate powder, α-tricalcium phosphate powder, and amorphous calcium phosphate powder, and mixtures of these powders with hydroxyapatite.

7. A method for producing an α-tricalcium phosphate ceramic having a relative density of at least 90% comprising the steps of: forming a tricalcium phosphate powder material by a wet method comprising combining phosphoric acid and calcium hydroxide to obtain amorphous tricalcium phosphate and then drying said amorphous tricalcium phosphate to form said powder material;

shaping the powder material prepared by the wet method using a monoaxial press method or a cold isostatic press method;

sintering the shaped powder material, at a temperature of 1100° to 1500° C. for 50 to 200 hours; and, subjecting the sintered product to cooling at a cooling rate of 100° to 2000° C./hr.

8. A method according to claim 1 wherein the shaped powder material is sintered for 50 to 100 hours.

9. A method according to claim 7 wherein the shaped powder is sintered for 50 to 100 hours.

* * * * *